J. NESBITT.
WIND-MILL.
No. 191,168. Patented May 22, 1877.
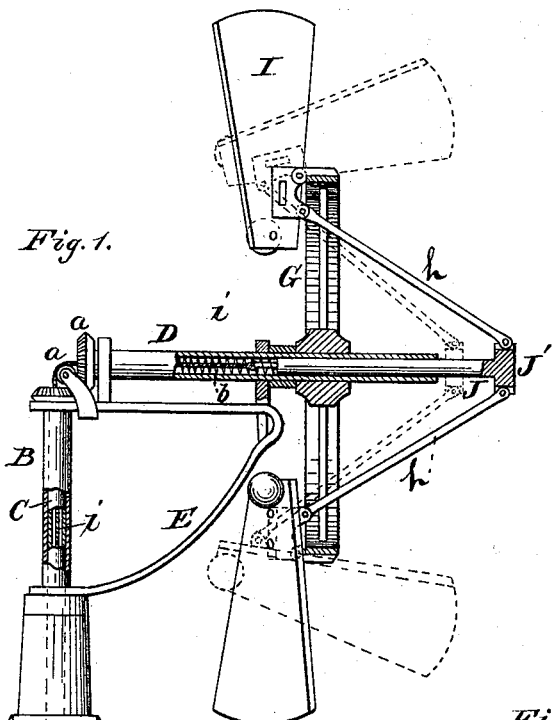
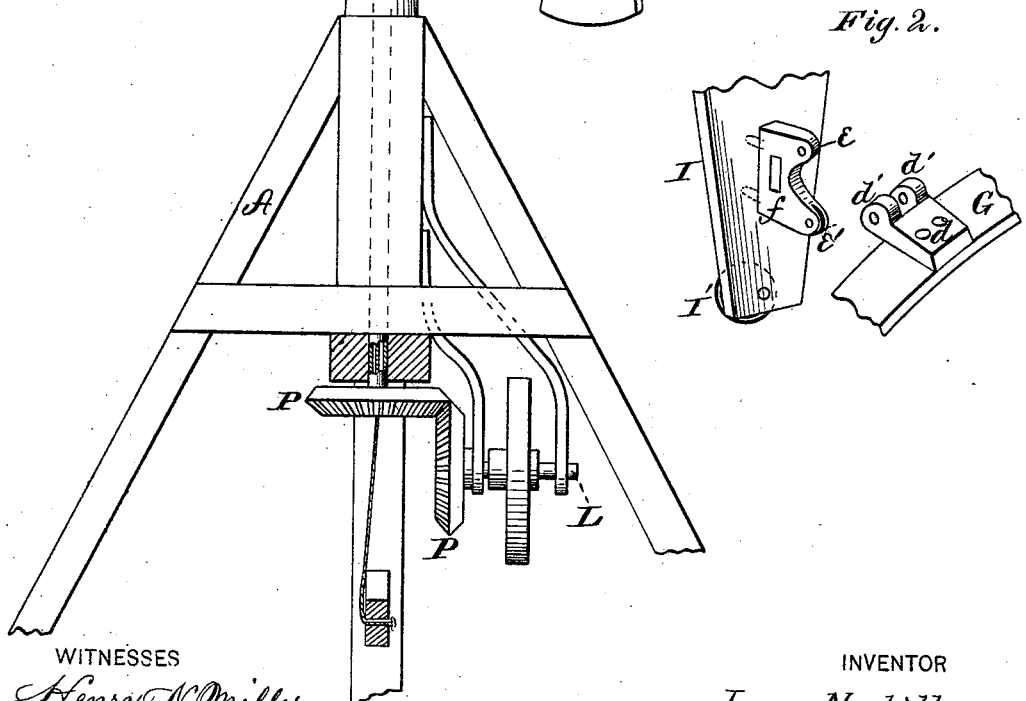

UNITED STATES PATENT OFFICE.

JAMES NESBITT, OF PRAIRIE RONDE, MICHIGAN.

IMPROVEMENT IN WINDMILLS.

Specification forming part of Letters Patent No. 191,168, dated May 22, 1877; application filed April 28, 1877.

*To all whom it may concern:*

Be it known that I, JAMES NESBITT, of Prairie Ronde, in the county of Kalamazoo, and in the State of Michigan, have invented certain new and useful Improvements in Windmills; and do hereby declare that the following is a full, clear, and exact description thereof, reference being had to the accompanying drawing, and to the letters of reference marked thereon, making a part of this specification.

The nature of my invention consists in the construction and arrangement of a windmill, as will be hereinafter more fully set forth.

In order to enable others skilled in the art to which my invention appertains to make and use the same, I will now proceed to describe its construction and operation, referring to the annexed drawing, in which—

Figure 1 is a side elevation, parts in section, of my windmill. Fig. 2 is a detached view, showing the hinge for the vanes.

A represents the derrick, which is constructed in any of the known and usual ways, and has its center post B made hollow. Through this hollow post is passed a tube or hollow shaft, C, rotated by means of bevel-gears $a\ a$ from the horizontal shaft D, which is supported by a frame, E, and has the wheel G secured on it.

The shaft D is also hollow, and has a spiral spring, $b$, inclosed within it to hold the fans or vanes to the wind.

The wheel G is in the form of an ordinary carriage-wheel, with the fans I I hung at regular intervals to the rim on the rear side of the wheel.

The means for hanging the fans to the wheel are shown in Fig. 2, and consist of a plate, $d$, fastened to the rim of the wheel, and having two projecting ears, $d'\ d'$. To the fan I is fastened a flange, $f$, having one ear, $e$, pivoted between the two ears $d'$ on the plate $d$, and below this ear $e$ is another ear, $e'$, connected by a brace, $h$, with a head, $J'$, on the outer end of a rod, J, which is inserted in the hollow shaft D, and has the spring $b$ bearing against the inner end.

The fans I are hung so as to be about one-third inside of the rim of the wheel and two-thirds outside, and they are all separate and independent of each other, with weights $I'$ attached to their inner ends. They are held in position by means of the braces $h$, held back by the spiral spring $b$, so as to keep the fans to the wind.

To put the mill out of gear the braces $h$ are drawn forward, turning the fans endwise to the wind.

$i$ is the cord that draws the wheel out of gear, and is attached to the inner end of the rod J, and passes through the spiral spring $b$ and down through the upright shaft C to a lever, K, that holds it out of gear.

The lower end of the upright shaft C is, by bevel-gears P, connected with a line-shaft, L, to run the same.

This windmill has no vane, and the wheel hangs behind the center-post, the wind holding the mill facing the wind at all times. It is perfectly self-regulating, and works the same as a governor on a steam-engine. When the wind blows hard it increases the motion, and the motion opens the fans so that they catch less wind, and hence the mill will have the same motion all the time, and does not stop, no matter how hard the wind blows.

Having thus fully described my invention, what I claim as new, and desire to secure by Letters Patent, is—

1. In a windmill, a series of separate fans, hung to a rotating wheel, and having their position or angle regulated by the centrifugal force, substantially as herein set forth.

2. The combination of the hollow shaft D, with interior spring $b$, the wheel G, fans I I, braces $h\ h$, and rod J, with head $J'$, all substantially as and for the purposes herein set forth.

3. The combination of the hollow wind-wheel shaft D, bevel-gears $a\ a$, hollow upright shaft C, and the hollow center-post B, of the derrick, as and for the purposes herein set forth.

In testimony that I claim the foregoing I have hereunto set my hand this 7th day of April, 1877.

JAMES NESBITT.

Witnesses:
THOMAS NESBITT,
JAMES WATKINS.